United States Patent Office 3,380,763
Patented Apr. 30, 1968

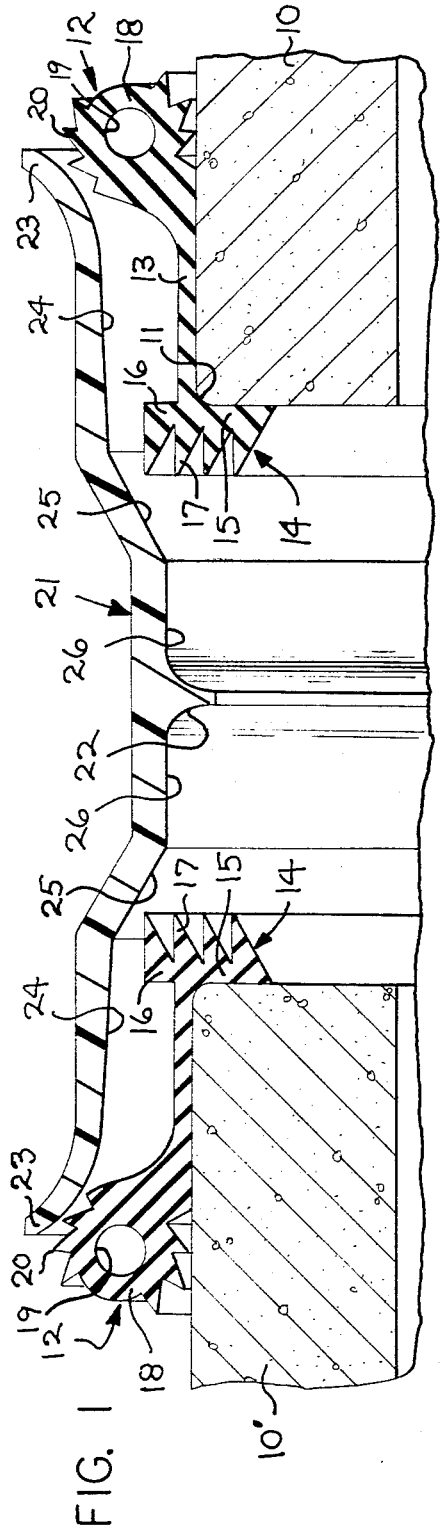
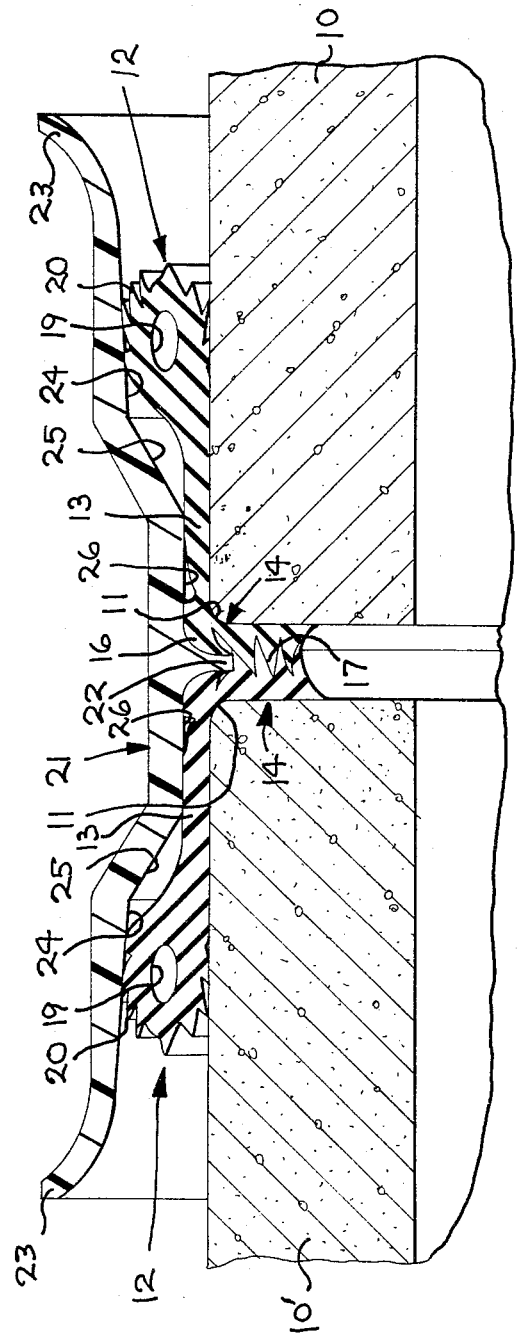

3,380,763
PLAIN END PIPE COUPLING
John D. Schmunk, Findlay, Ohio, assignor to The Hancock Brick & Tile Company, Findlay, Ohio, a corporation of Ohio
Filed Apr. 27, 1966, Ser. No. 545,610
2 Claims. (Cl. 285—110)

ABSTRACT OF THE DISCLOSURE

A coupling for effecting a fluid-tight seal between the adjacent ends of plain end sewer pipes. The coupling consists of an identical cap seal of elastomeric material for each of the plain end pipes. The cap seal has a cylindrical body which has snap engagement about the respective pipe end portion. At one end of the cylindrical body is a flange which abuts the face or end portion of the pipe and extending radially outwardly therefrom is an extension which is crowded into sealing engagement by a cylindrical surface of a sleeve into which the two end portions of the pipes and the cap seals extend. Adjacent such cylindrical portion of the housing is an abruptly tapered surface which cams the extension into its crowded position as above suggested. At the outer portion of the sleeve at each end, is an elongate inwardly tapered internal wall, the inclination of the taper being gentle and this is effective in gradually compressing a ring-like rounded rim on the opposite end portion of the cylindrical body of the cap seal. The flange at the opposite end of the cap seal body portion has teeth and the teeth of the two cap seals are mashed together when the pipe ends are forced relatively into engagement with the housing to effect a desired seal in this region. These teeth may either mesh with each other or, depending upon the disposition of the teeth relative to each other, may be mashed together. Centrally of the housing, is an internal flange for disposition between the adjacent flanges of the cap seals.

Figure 3:
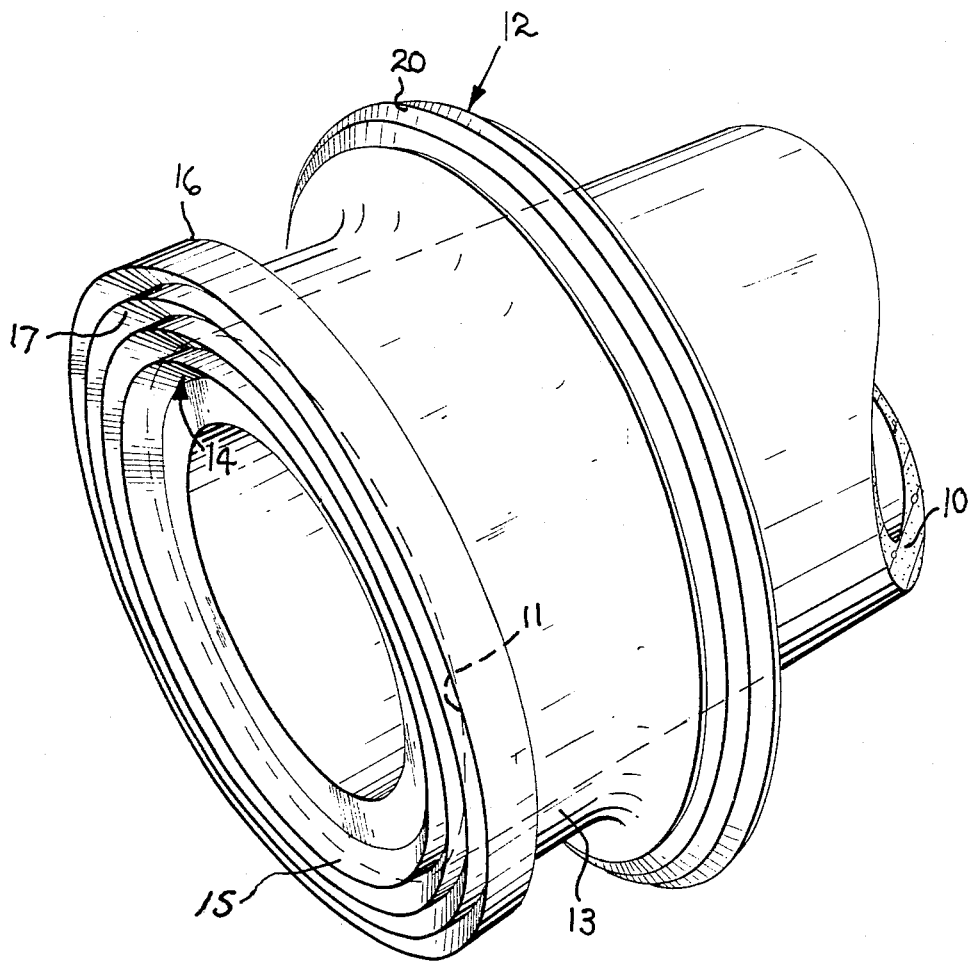

A definite need exists for precision sewer pipe joints and difficulty has been experienced in obtaining high quality joints in which the sewer pipes employ the conventional bell and spigot ends because of bell failures under tension. Since these failures often occur after the sewer line is covered, improved couplings of this general character are needed in the industry.

According to applicant's invention, the use of less expensive plain end clay or concrete sewer pipes is had and applicant's coupling provides a three-piece triple seal arrangement that places all pipe ends in compression rather than tension. It is inconceivable for pipe ends employing this invention to break or fail under uniform circumferential compression.

A further advantage of applicant's invention is that no special tools are required for effecting the coupling of plain end pipes and the installation of the coupling parts is both rapid and dependable from the standpoint of permanent trouble free service.

Although applicant's coupling total assembly consists of three pieces, the actual installation involves only one piece, the central housing, the cap seals for the pipe ends having already been installed at the factory producing the pipe. Except for some ordinary lubrication of the parts, the only effort required to couple the pipe sections is to apply force to the out end of the last pipe laid, thus driving the joint into secure envelopment. No excavation for the conventional bell end is required since the coupling is only slightly larger in diameter than the sewer pipe.

It is the object therefore, to produce a simple coupling of the above character.

This invention relates to a new and improved pipe coupling which enables plain end pipes to be connected together in fluid-tight relation by simply pressing the pipe into position with the coupling without requiring the use of special tools and provides cap seals which not only protect the pipe ends before being applied in coupled relation but also cooperate in a novel manner with a sleeve housing to effect the desired seal and coupling.

Other objects and advantages will hereinafter appear and, for purposes of illustration but not of limitation, an embodiment of the invention is shown on the accompanying drawings, in which FIGURE 1 is a fragmentary longitudinal sectional view of a pair of axially aligned plain end pipes, each having a cap seal at the end thereof, and showing same in position preparatory to be forced into sealing engagement with a housing sleeve;

FIGURE 2 is a fragmentary sectional view similar to to FIGURE 1 but showing the coupling in position of use connected to the pipe ends; and FIGURE 3 is an enlarged perspective view of a plain end pipe to which a cap seal is applied.

The illustrated embodiment of the invention comprises a pair of axially aligned plain end sewer pipes 10 and 10' having continuous cylindrical surfaces, which are shown of concrete but they may be of clay or any suitable material. As shown, the free end of each pipe has its outer edge portion rounded as indicated at 11. Fitted over the end of each pipe is a unitary cap seal 12, which is in the form of an annulus of elastomeric material, such, for example, as neoprene, or a nonmetallic plastic material having the desired characteristics. Each cap seal has a relatively thin elongate cylindrical body 13 of somewhat less diameter than the outside diameter of the pipe so that it can be flexed and snapped over to embrace and intimately engage the outer wall of the pipe. Formed at the inner end of the body 13 is an annular flange 14, which is disposed at right angles to the body and is composed of an inwardly extending section 15, which covers and abuts against a portion of the free or face edge of the pipe. Forming a continuation of the section 15 is an outwardly extending flange section 16, which projects laterally of the body 13 a distance of approximately one-half the length of the flange section 15. Formed on the outer face of the sections 15 and 16 of the flange 14 are serrations or teeth 17, which are of substantial dimensions for the purpose of effecting a cushioning action to prevent damage to the pipe during handling, etc. and to effect appropriate sealing engagement with its counterpart on the other cap seal, as will hereinafter be described.

At the opposite end of the cap seal body 13 is a rounded rim or cylindrical rope-like bead 18, which projects outwardly from the body a distance substantially beyond that of the flange section 16. The bead or rim 18 has a central hole or cavity 19, which extends entirely around it to enhance its flexibility and deformability. On the bead 18 is a plurality of lips or serrations 20, which are angled outwardly, there being four lips on the outer side of the bead and a similar number on the inner side, the inner lips being adapted to be forced into sealing engagement with the outer pipe wall and the outer lips with a sleeve or housing, as will hereinafter appear.

It will be understood that a cap seal 12 is applied to the adjacent ends of each of the pipes 10 and 10′. The two cap seals and the adjacent pipe ends are enclosed by an open-ended sleeve housing 21, which is preferably of suitable plastic material, such as polyethylene; one such material which is found to be particularly satisfactory for the purpose is "Alathon" produced by E. I. du Pont de Nemours & Co. The housing 21 is of sufficient length so that it extends substantially over the end portions of the adjacent pipes 10 and 10′.

The housing 21 has an internal centrally disposed radial cylindrical flange 22, which projects a short distance inwardly and is formed with outwardly and laterally curved side walls. The opposite ends of the housing 21 are outwardly flared, as indicated at 23, to facilitate entrance of the pipes, and adjacent the flared ends are relatively long inwardly tapered surfaces 24, the degree of taper being gentle gradually inclining inwardly from the adjacent flared end. Contiguous to the inner end of each tapered surface 24 is a relatively short tapered surface 25, which is more abrupt and inclines downwardly and inwardly and at a sharp angle and terminates in a coaxial cylindrical surface 26. Between the cylindrical surfaces 26 is the radial flange 22.

To facilitate the application of the pipes and cap seals to the housing 21 an ordinary soap lubrication is first brushed or otherwise applied to the housing bell which comprises the flared surface 23 and the tapered surfaces 24 and 25. After the pipe with its cap seal applied thereto is properly aligned with the housing it is forced into place by a pry-bar, which is accepted procedure for this purpose. The pipe is thus forced into position until the flange section 16 has been compressed tightly against the radial flange 22. The flange section 15 is forced into sealing engagement with its counterpart on the cap seal of the other pipe end, as indicated on FIGURE 2. Thus, the serrations or teeth 17 interlock or are mashed together under pressure to form a fluid-tight seal between the ends of pipes which is effective for sealing exfiltrated liquids from contact with the inner wall of the housing 21. The shape of the flange 14 is such as to retain the cap seal against movement as the coupling is forced together.

The design is such that the coupling provides for support of the shear load near the pipe ends and is of such positive nature that the sealing beads or rims 18 need not function as permanent load-bearing members. Since the residual load is so near the coupling center and this load is on a positive structural support, the coupling allows very little out-of-line difficulties between adjacent pipes. The principle involved in this load support is that of a third class lever. It will be noted that the section 16 of each flange 14 is crowded and deformed against the respective side of the radial flange 22. It will further be observed that the taper of the housing bell insures an effective compression of the cylindrical beads or rims 18 and insures that maximum compression develops as the pipe ends and seals are forced "home" in the housing. At this point the extreme ends of the pipes are within the smaller inside diameter or surface 26 of the housing 21, where they are physically supported against shear loads which develop in an underground sewer installation. Due to the construction of the parts, an efficient sealing joint is achieved even though there is some variation in the circumference of the adjacent pipe ends. In this connection it should be observed that the housing 21 has a certain amount of flexibility to accommodate any out of roundness which might be encountered.

It will be manifest that the sealing beads or rims 18 are shaped to compress as they are forced into the tapered section of the housing and due to the serrations 20 with the tooth angles disposed against infiltration pressures, these beads seal effectively even under low liquid pressures. The serrations 20 are flexible and angled outwardly against the in-flow of liquids and as well as engaging the housing 21 they intimately contact the pipe wall regardless of irregularities in its surface. In compression these beads develop high pressures both on the pipe surfaces and the housing interior tapered wall, thus insuring against both infiltration and exfiltration of liquids as well as against root penetration of the joint. Thus the beads 18 with their teeth or serrations 20 afford a primary seal and a secondary seal is achieved through the compaction of the serrations or teeth 17 when they are deformably forced against the walls of the flange 22 as well as against each other to effect a compact barrier to the passage of liquids either out from the pipes or into the pipes. Additionally, this secondary seal is effective in preventing pipe-contained liquids from coming into contact with the inner wall of the housing 21.

Another important feature of the assembly resides in the fact that the pipe ends stay within allowable misalignment tolerances and the housing 21 carries the residual shear loads, thus relieving the primary sealing beads 18 of all but the compressive forces inherent in the coupling itself, these forces being relatively uniform around the seal.

It should be understood that the flared open ends of the housing 21 permit the lodgment of soil or fill against the edge of the seal thus blocking any extrusion forces encountered in a sewer line. The slight taper angle 24 contributes to the ease of the entry of the seal and offers minimum inclination for the bead 18 to move or for the pipe to "rebound."

As above indicated, the pipe seals 12 may be applied to the ends of the smooth end pipes at the factory and this affords a protection to the pipes while being moved from place to place and militates against their being damaged since they serve to cushion any accidental impacts during the handling of the pipes.

Numerous changes in details of construction, arrangement and choice of materials may be effected without departing from the spirit of the invention especially as defined in the appended claims.

What I claim is:

1. A coupling for effecting a fluid-tight seal between the adjacent ends of pipes having continuous cylindrical surfaces, said coupling comprising unitary cap seals of elastomeric material carried by the end portions of the pipes respectively, each cap seal comprising a cylindrical body portion having snap engagement about a pipe, a ring-like rounded rim projecting outwardly beyond the surface of said body portion and disposed at the rear end thereof, and a circular flange at the front end of said body portion disposed at right angles thereto and abutting against the face of the pipe, said circular flange having a circular extension projecting radially and laterally beyond said cylindrical body portion, and a coaxial housing sleeve receiving the end portions of both cap seal mounted pipes, said sleeve having relatively elongate inwardly tapered internal walls at each end thereof, the inclination of the taper being relatively gentle so that upon the introduction of the cap seals said rims are gradually compressed into intimate sealing engagement with both the pipe walls and the sleeve, relatively short abruptly inwardly tapered walls at the forward ends of said elongate walls, cylindrical internal walls disposed forwardly of said tapered walls, and a central radial rib between said last cylindrical walls, extending radially inwardly at least to the outer periphery of said pipes, whereby when the pipes are forced into said sleeve housing said rims effect a seal between the outside walls of the pipe and said elongate walls of the sleeve housing, said circular extension is crowded by said abruptly tapered walls into intimate sealing engagement with said cylindrical internal walls and said radial rib, and said flanges of the cap seals are pressed intimately together to effect a seal between the pipe ends.

2. A coupling as claimed in claim 1 comprising outwardly extending flexible teeth on the outer side of said cap seal flange whereby when such flanges of the respective cap seals are forced into engagement they either mesh with each other or are mashed into intimate engagement for insuring sealing contact.

References Cited

UNITED STATES PATENTS

| | | | |
|---|---|---|---|
| 2,366,814 | 1/1945 | Smith | 285—369 X |
| 3,163,432 | 12/1964 | Boer | 285—332 X |

FOREIGN PATENTS

| | | |
|---|---|---|
| 236,823 | 12/1961 | Australia. |
| 1,244,780 | 9/1960 | France. |
| 836,770 | 4/1952 | Germany. |
| 1,185,431 | 1/1965 | Germany. |

CARL W. TOMLIN, *Primary Examiner.*

R. G. BERKLEY, *Assistant Examiner.*